(12) United States Patent
Park et al.

(10) Patent No.: US 8,463,965 B2
(45) Date of Patent: Jun. 11, 2013

(54) INTERNAL DISPLAY PORT INTERFACE TEST METHOD AND DEVICE

(75) Inventors: Dongwon Park, Goyang-si (KR); Sunghoon Kim, Paju-si (KR); Sungwon Kim, Yongin-si (KR); Chongho Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 104 days.

(21) Appl. No.: 13/157,061

(22) Filed: Jun. 9, 2011

(65) Prior Publication Data

US 2011/0310252 A1 Dec. 22, 2011

(30) Foreign Application Priority Data

Jun. 17, 2010 (KR) .................. 10-2010-0057454

(51) Int. Cl.
*G06F 3/00* (2006.01)
*G06F 13/00* (2006.01)

(52) U.S. Cl.
USPC ................ 710/104; 710/17; 710/19

(58) Field of Classification Search
None
See application file for complete search history.

(56) References Cited

U.S. PATENT DOCUMENTS 7,853,731 B1 * 12/2010 Zeng ......................... 710/18
2010/0272102 A1 * 10/2010 Kobayashi ................ 370/389

* cited by examiner

*Primary Examiner* — Idriss N Alrobaye
*Assistant Examiner* — Zachary K Huson
(74) *Attorney, Agent, or Firm* — Brinks Hofer Gilson & Lione

(57) ABSTRACT

An iDP interface test method includes transmitting test clocks to an iDP sink device; determining whether or not a link clock lock operation in the iDP sink device is successful based on a measurement result of an HPD signal when a clock lock operation for the test clocks is performed; transmitting test data and arbitrary video data to the iDP sink device if the link clock lock operation in the iDP sink device is successful; determining whether or not a symbol lock operation in the iDP sink device is successful when the symbol lock operation for the test data and the arbitrary video data is performed; and comparing a count result with a predetermined reference value, and determining link stability of the iDP sink device based on the comparison result.

9 Claims, 9 Drawing Sheets

INTERNAL DISPLAY PORT INTERFACE TEST METHOD AND DEVICE

This application claims the benefit of Korea Patent Application No. 10-2010-0057454 filed on Jun. 17, 2010, the entire contents of which is incorporated herein by reference in its entirety for all purposes as if fully set forth herein.

BACKGROUND

1. Field of the Invention

This disclosure relates to internal display port (iDP) interface test method and device, and more particularly to a method and a device for testing a sink device in an iDP interface.

2. Discussion of the Related Art

The applications for a liquid crystal display have increasingly widened due to its characteristics such as light weight, thin profile, and low power consumption driving. The liquid crystal display is used in a portable computer such as a notebook PC, an office automation device, an audio/video device, an indoor and outdoor advertisement display device, or the like. The liquid crystal display controls electric fields applied to liquid crystal cells so as to modulate light provided from a backlight unit, thereby displaying images.

In order to satisfy needs for high definition display performance from users, the liquid crystal display has increasingly implemented high image quality images at high channel transmission bandwidth and high frame refresh rate for video data. At present, in a television set system, video data transmission between a system on chip ("SoC") generating video data to be displayed on a liquid crystal display panel and a timing controller controlling operation timings of driving circuits of the liquid crystal display panel uses an LVDS (Low Voltage Differential Signaling) interface. The LVDS interface is advantageous in that it has low power consumption and is less influenced by external noise due to use of low voltage swing level and differential signal pair, but is inappropriate for transmission of video data of high resolution due to the limitation of the data transmission rate.

A DP (Display Port) interface is an interface regulated by Video Electronics Standards Association (VESA) and is an interface scheme which integrates LVDS, which is the existing internal interface standard, with DVI (Digital Visual Interface) which is an external connection standard into one. The DP interface is a technique which cannot only make an internal connection between chips but also make an external connection between products by digital. Since two divided interfaces are integrated into one, and thus it is possible to support higher color depth and resolution by widening data bandwidth. The DP interface has the bandwidth of the maximum 10.8 Gbps which is twice or more that of the existing DVI (maximum 4.95 Gbps), and can simultaneously transmit six streams of the maximum 1080*i* (three 1080*p*) through one connection by supporting multi-streams using a micro-packet architecture. In addition, the DP interface mounts bidirectional auxiliary channels of 1 Mbps bandwidth and can thereby support applications such as a screen chatting and an internet telephone (VoIP) together.

FIG. 1 is a diagram illustrating a circuit configuration for a sink jitter tolerance test which is presented by the DP interface standard.

With reference to FIG. 1, the DP interface test device includes a stress signal generator (SSG) 51, a clock pattern generator 52, an auxiliary channel controller 53, and a test fixture 54.

A reception side DP sink device 55 is an element to be tested and is used as a reception circuit in the DP interface. The stress signal generator 51, the clock pattern generator 52, and the auxiliary channel controller 53 are connected to the lane input terminals and the auxiliary input terminals of the test fixture 54.

The test fixture 54 is connected to the reception side DP sink device (55) via a test connector, and is also connected to the stress signal generator 51, the clock pattern generator 52, and the auxiliary channel controller 53 via another test connector. The test fixture 54 relays signal transmission without frequency loss through the impedance matching of the loads connected to both of the connectors. The test fixture 54 includes an HPD (Hot Plug Detect) terminal in addition to the terminals connected to main link lanes and the auxiliary channel terminals. In the test method for the DP interface, the HPD lets a connection state between the test fixture 54 and the reception side DP sink device 55 known.

The stress signal generator 51 outputs test data including inter-symbol interference (ISI), random jitter (RJ), and sinusoidal jitter (SJ), and the like. The test data output from the stress signal generator 51 is a differential signal pair having positive and negative signals and is transmitted to the test fixture 54 via the main link lanes each of which is formed by a pair of signal lines.

The clock pattern generator 52 generates D24.3 (Quad-Rate Clock Pattern) clock signals which are defined in the DP interface standard, in order to reflect a crosstalk component which has influence on transmission lines. The D24.3 clock signal pattern is a clock pattern such as 11001100. The clock signals output from the clock pattern generator 52 are transmitted via both of the lanes in each of the main link lanes via which the test data is transmitted.

A tester sets one link rate of 1.62 Gbps and 2.70 Gbps which are transmission rates by setting LINK_BW_SET (address 0x100) of DPCD (Display Port Configuration Data) using the auxiliary channels each time a test is performed, and, in the same manner, sets lanes to be tested by setting LANE_COUNT_SET (address 0x101). Typically, the sink device stress test is classified into a link clock lock test, a symbol lock test, PRBS (Pseudo Random Bit Sequence) counter test, and a BER (Bit Error Rate) test.

In the link clock lock test, the stress signal generator 51 transmits test data where jitter is inserted into the D10.2 pattern defined in the DP interface standard. The reception side DP sink device 55 stores a recovery error amount which is generated when recovering the D10.2 pattern into which jitter is inserted, in a designated field of an internal DPCD register. The tester makes a request for the recovery error amount for the link clock lock test via the auxiliary channel controller 53, monitors the recovery error amount for the link clock lock test which is sent from the reception side DP sink device 55, and can thereby check how well the reception side DP sink device 55 recovers the test data.

In the symbol lock test, the stress signal generator 51 transmits a symbol lock pattern into which jitter is inserted, and the reception side DP sink device 55 stores a recovery error amount which is generated when recovering the symbol lock pattern into which jitter is inserted, in a designated field of the internal DPCD register. The tester makes a request for the recovery error amount for the symbol lock test via the auxiliary channel controller 53, monitors the recovery error amount for the symbol lock test which is sent from the reception side DP sink device 55, and can thereby check how well the reception side DP sink device 55 recovers the test data.

If link training via the main link lanes satisfies conditions for passing the link clock lock test and the symbol lock test, the stress signal generator 51 changes the test data pattern to a PRBS7 pattern which is transmitted after errors are inserted thereinto in an amount defined regarding the pattern. The reception side DP sink device 55 counts errors in the received PRBS7 pattern and stores a result thereof in a designated field of the internal DPCD register. The tester makes a request for the error count result via the auxiliary channel controller 53, monitors the error count result sent from the reception side DP sink device 55, and can thereby check whether or not the error counter of the reception side DP sink device 55 normally works.

As above, when all the functions of the reception side DP sink device 55 are verified, the stress signal generator 51 transmits the PRBS7 pattern into which jitter is inserted for a given time, and the reception side DP sink device 55 can pass the test if BER detected by the reception side DP sink device 55 is equal to or less than 1E-9 errors/sec for the given time.

The DP interface test method requires auxiliary channels AUX and also requires the DPCD register inside the reception side DP sink device 55. Further, the DP interface test method requires separate lanes for transmitting auxiliary channels in addition to the main link lanes for transmitting data, and requires the DPCD register and logics processing the register. In addition, the DP interface performs reading and writing through auxiliary channel communication and requires interface software for checking it. Therefore, costs for realizing the DP interface test method are high.

In recent years, VESA has defined an iDP interface standard. The iDP interface has been optimized as an interface between a System-on-chip (SoC) and a timing controller of a display device based on the existing DP interface. The iDP interface supports the serial data link rate of 3.24 Gbps for the lanes for transmitting the differential signal pair, and thus it is possible to transmit video data of high color depth, resolution, and frame refresh rate at a low lane count. The iDP interface does not use clock transmission lines separately in the same manner as the DP interface, and thereby it is necessary for a reception circuit Rx to perform a CDR (Clock and Data Recovery) process for recovering clock signals.

On the other hand, since there are no auxiliary channels AUX in the iDP interface, a reception side sink device cannot be tested in the same manner as the DP interface.

BRIEF SUMMARY

Embodiments of this disclosure provide iDP interface test method and device suitable for testing a reception side sink device in an iDP interface.

According to an embodiment of this disclosure, there is provided an iDP interface test method including transmitting test clocks to an iDP sink device; determining whether or not a link clock lock operation in the iDP sink device is successful based on a measurement result of an HPD signal output from the iDP sink device when a clock lock operation for the test clocks is performed; transmitting test data and arbitrary video data to the iDP sink device if the link clock lock operation in the iDP sink device is successful; determining whether or not a symbol lock operation in the iDP sink device is successful based on a measurement result of the HPD signal output from the iDP sink device when the symbol lock operation for the test data and the arbitrary video data is performed; and counting the trigger number of the HPD signal for a given time, comparing the count result with a predetermined reference value, and determining link stability of the iDP sink device based on the comparison result.

According to an embodiment of this disclosure, there is provided an iDP interface test device including a test clock generator configured to generate test clocks; a test data generator configured to generate test data and arbitrary video data; an iDP sink device configured to make an HPD signal have a high logic level when a clock lock operation for the test clocks is successful, maintain the HPD signal to be in the high logic level when a symbol lock operation for the test data and the arbitrary video data is successful, and make the HPD signal have a low logic level when the clock lock operation and the symbol lock fail; a test fixture configured to be connected between the test clock generator and the test data generator, and the iDP sink device and transmit the test clocks, the test data, and the arbitrary video data to the iDP sink device; a counter configured to count the trigger number of the HPD signal; and a test determination unit configured to determine whether or not a link clock lock operation in the iDP sink device is successful based on a measurement result of the HPD signal generated when a clock lock operation for the test clocks is performed; determine whether or not a symbol lock operation in the iDP sink device is successful based on a measurement result of the HPD signal when the symbol lock operation for the test data and the arbitrary video data is performed; and compare an output from the counter with a predetermined reference value, and determine link stability of the iDP sink device based on the comparison result.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Figure 1:
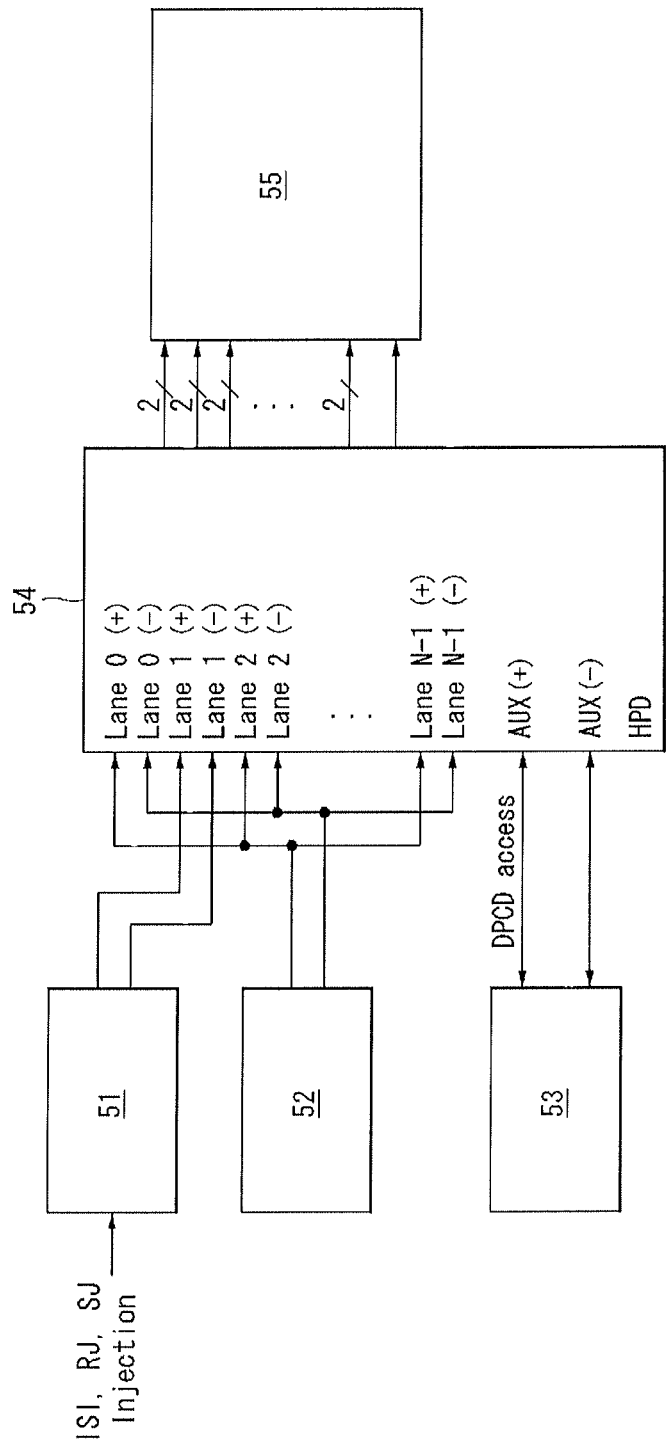
FIG. 1 is a block diagram illustrating a DP interface test device.

Hereinafter, embodiments of this disclosure will be described in detail with reference to the accompanying drawings. Like reference numerals designate like elements throughout the specification. In the following description, when a detailed description of well-known functions or configurations related to this disclosure is determined to unnecessarily cloud a gist of the present invention, the detailed description thereof will be omitted.

Figure 2:
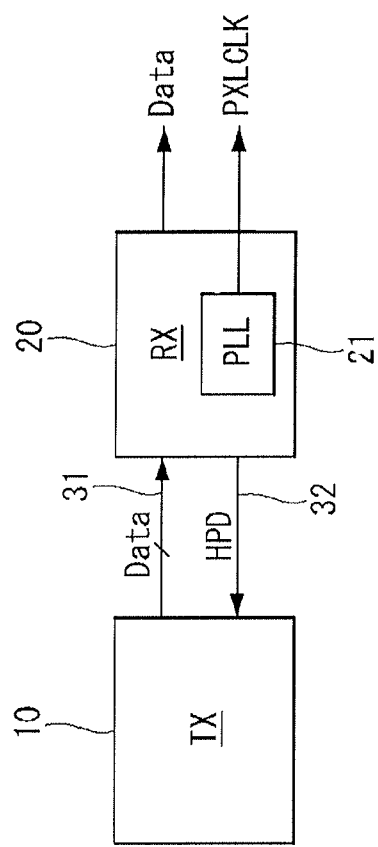
FIG. 2 is a diagram illustrating an iDP transmission circuit and an iDP reception circuit according to an embodiment of this disclosure.
Figure 3:
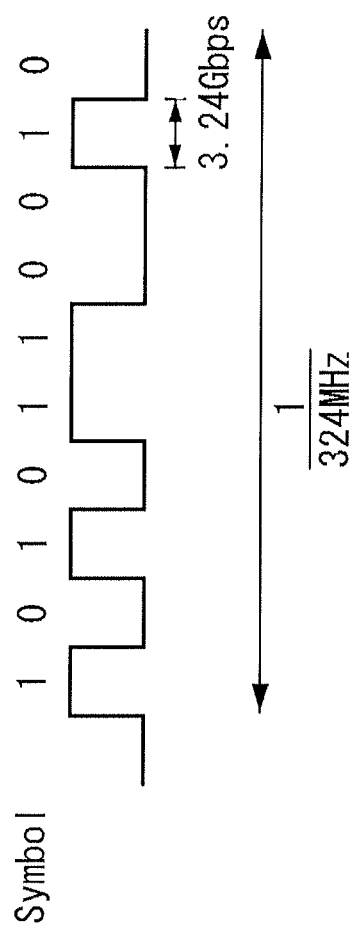
FIG. 3 is a waveform illustrating an example of link symbol clocks of 3.24 Gpbs which are transmitted via main link lanes in the iDP interface.

With reference to FIGS. 2 and 3, an iDP interface includes a plurality of main link lanes 31 connected between an iDP transmission circuit 10 and an iDP reception circuit 20. Each of the lanes 31 includes a pair of lines for transmitting a differential signal pair. Also, the iDP interface includes an HPD (Hot Plug Detect) transmission line 32. The iDP transmission circuit 10 is a source device and detects an HPD signal which is received via the HPD transmission line 32. The iDP transmission circuit 10 transmits main link data, which is encoded by ANSI 8B/10B encoding scheme, via the main link lanes 31 during a period where the HPD signal is maintained to be in a high logic level from a rising edge of the HPD signal. The iDP reception circuit 20 is a sink device, and receives Mvid values sent via the main link lanes 31 and recovers pixel clocks PXLCLK using an M/N PLL 21 during a blanking interval. In addition, the iDP reception circuit 20 transmits the HPD signal having a low logic level to the iDP transmission circuit 10 in a stand-by mode, and locks the pixel clocks and phases of data symbols output from the M/N PLL 21 in the stand-by mode.

There are no lines for transmitting clocks between the iDP transmission circuit 10 and the iDP reception circuit 20. Therefore, the M/N PLL 21 of the iDP reception circuit 20 recovers the pixel clocks PXLCLK by multiplying the link symbol clocks LSCLK of the main link data received via the main link lanes 31 by the multiplication ratio of Mvid/48. The serial bit rate of the link symbol clocks LSCLK is 3.24 Gbps/lane, and the frequency thereof fLSCLK is 324 MHz/sec. The Mvid value is an integer between 0 and 255 which can be obtained with 8 bits.

In the iDP interface, the HPD signal is used to generate link training, In other words, the link clock lock operation and the symbol lock operation between the iDP transmission circuit 10 and the iDP reception circuit 20 before transmitting video data. When the link clock lock and the symbol lock are unlocked and thus the link with the iDP transmission circuit 10 is not formed, the iDP reception circuit 20 pulls the HPD signal down to the low logic level. When the HPD signal is reversed to the low logic level, the iDP transmission circuit 10 transmits the link clock lock pattern data D10.2 (TPAT1), which is defined in the iDP interface standard, to the iDP reception circuit 20 in order to generate the link clock lock and the symbol lock after the reaction time of $t_{T1D}$ shown in FIGS. 4 and 5 has elapsed. Time taken to regenerate the link clock lock in the iDP reception circuit 20 is $t_{HPL}$ shown in FIGS. 4 and 5, and the iDP reception circuit 20 maintains the HPD signal to be in the low logic level during the period.

When the link clock lock is generated, the iDP reception circuit 20 pulls the HPD signal up to the high logic level, and the iDP transmission circuit 10 transmits the symbol lock pattern data TPAT2 for generating the symbol lock after the reaction time of $t_{T2D}$ has elapsed, to the iDP reception circuit 20. The iDP reception circuit 20 is required to finish the symbol lock operation within the maximum $t_{T2P\_RX}$ in FIG. 4. The iDP transmission circuit 10 transmits video data pattern to the iDP reception circuit 20 while the iDP reception circuit 20 succeeds in the symbol lock and the HPD signal is maintained to be in the high logic level. The iDP reception circuit 20 maintains the HPD signal to be in the high logic level until the link with the iDP transmission circuit 10 fails again.

Figure 4:
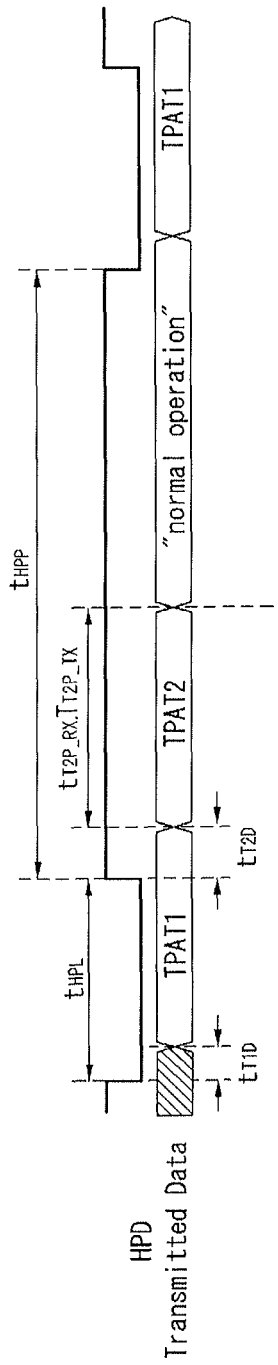
FIGS. 4 and 5 are timing diagrams illustrating timing margins in the course of operations between the iDP transmission circuit and the iDP reception circuit, which are defined in the iDP interface standard.
Figure 5:
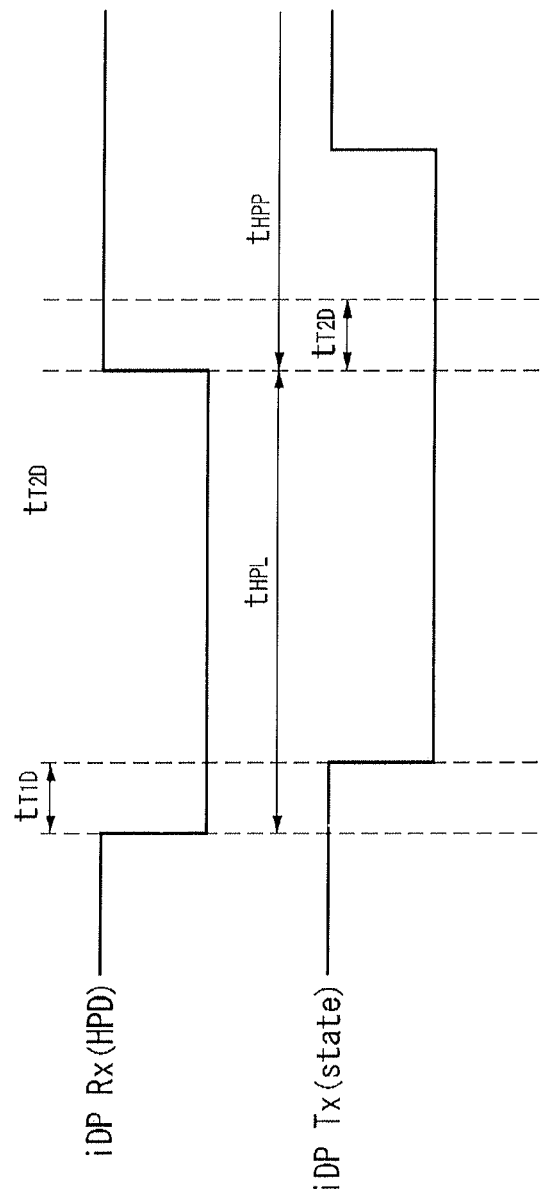

FIGS. 4 and 5 are timing diagrams illustrating timing margins in the course of operations between the iDP transmission circuit 10 and the iDP reception circuit 20, which are defined in the iDP interface standard.

In FIGS. 4 and 5, the time $t_{T1D}$ is waiting time until the iDP transmission circuit 10 transmits the link clock lock pattern TPAT1 after the iDP reception circuit 20 pulls the HPD signal down to the low logic level. The time $t_{T1D}$ is allowable ranging from minimum 0 μsec to maximum 50 μsec from the pulled-down point of the HPD signal.

The time $t_{HPL}$ is time when the HPD signal is maintained to be in the low logic level. The time $t_{HPL}$ is allowable ranging from minimum 50 μsec to maximum 500 μsec from the pulled-down point of the HPD signal. When the link clock lock is successfully performed within the time $t_{HPL}$, the iDP reception circuit 20 pulls the HPD signal up to the high logic level. According to the embodiment, the iDP transmission circuit 10 determines that link recovery fails if the iDP reception circuit 20 does not succeed in the link clock lock even after 500 μsec has elapsed from the pulled-down point of the HPD signal.

The time $t_{T2D}$ is waiting time until the iDP transmission circuit 10 transmits the symbol lock pattern data TPAT2 after the iDP reception circuit 20 pulls the HPD signal up to the high logic level. The time $t_{T2D}$ is allowable ranging from minimum 0 μsec to maximum 50 μsec from the pulled-up point of the HPD signal.

The time $t_{T2P\_RX}$ is waiting time until the iDP transmission circuit 10 transmits the symbol lock pattern data TPAT2 after the iDP reception circuit 20 pulls the HPD signal up to the high logic level. The time $t_{T2P\_RX}$ is allowable ranging from minimum 0 μsec to 50 μsec from the pulled-up point of the HPD signal.

The time $t_{T2D\_TX}$ is time for the iDP transmission circuit 10 to transmit the symbol lock pattern data TPAT2 to the iDP reception circuit 20. The iDP reception circuit 20 is required to succeed in the symbol lock within maximum 80 μsec after the time $t_{T2P\_RX}$.

The time $t_{HPP}$ is time between the rising edge and the falling edge of the HPD signal. The time $t_{HPP}$ is set to maximum 2 msec.

The iDP interface has no DPCD and auxiliary channels. The embodiment of this document provides a method and a device for testing whether or not the link clock lock and the symbol lock are successfully performed when the sink device test is performed for the iDP reception circuit 20, based on the HPD specification of the iDP interface standard, without using the DPCD and the auxiliary channels.

Figure 6:
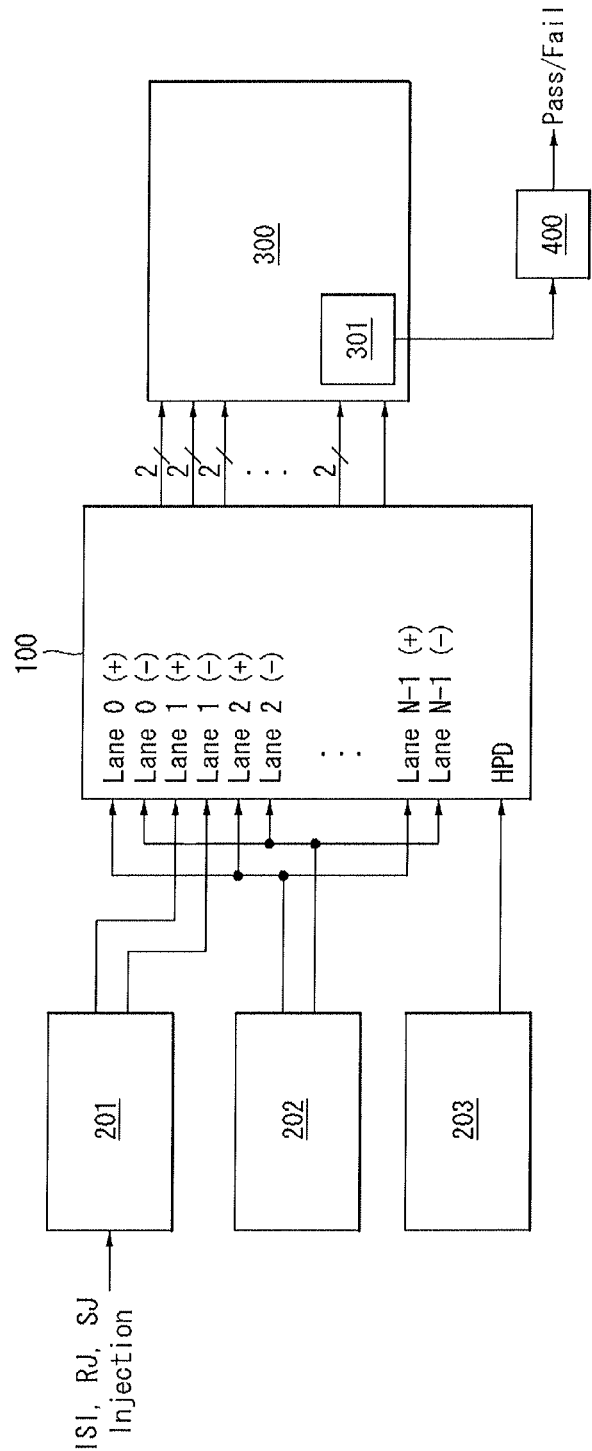
FIGS. 6 and 7 are block diagrams illustrating iDP interface test devices according to embodiments of this disclosure.
Figure 7:
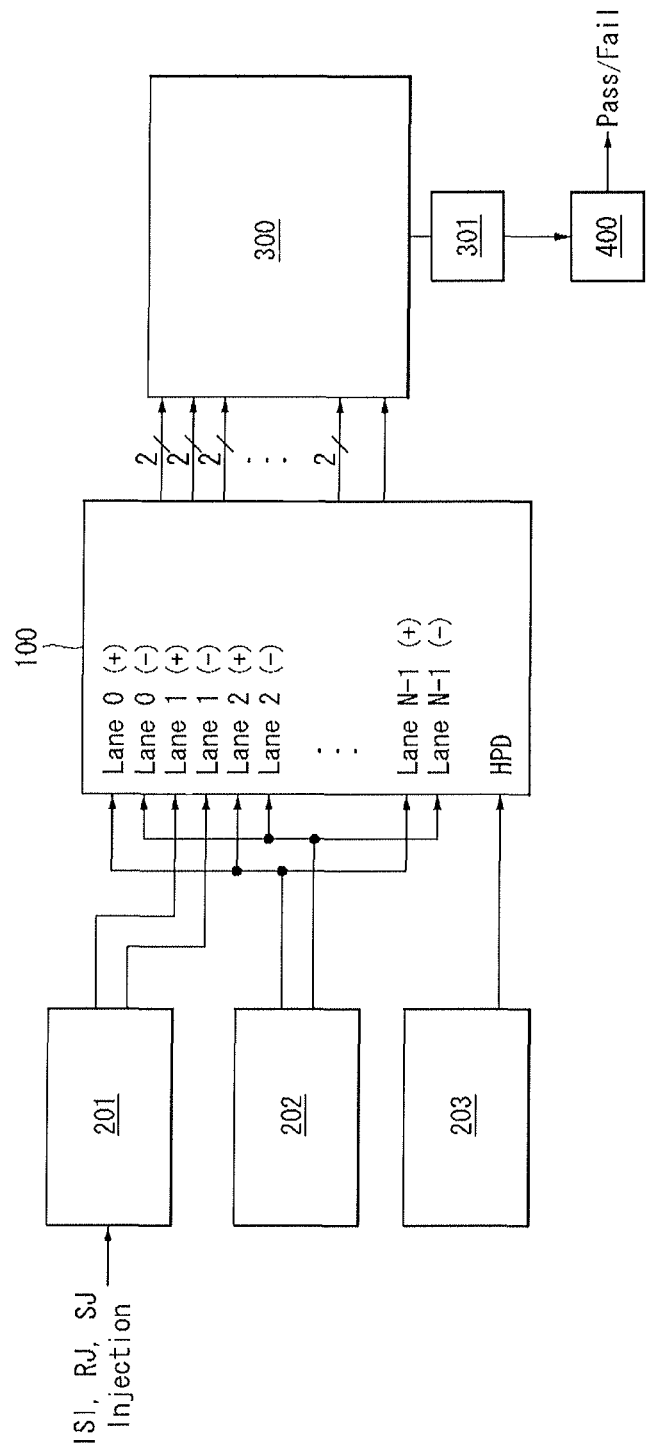

FIGS. 6 and 7 show iDP interface test devices according to embodiments of this document.

Referring to FIGS. 6 and 7, the iDP interface test device includes a test data generator 201, a test clock generator 202, an HPD monitor 203, and a test fixture 100.

An iDP reception circuit 300 embeds a counter 301 therein or is connected to an external counter 301 as shown in FIGS. 6 and 7. The counter 301 counts the trigger number or the trigger frequency of the HPD signal during the iDP interface test. The counter 301 is connected to a test determination unit 400 and transmits a count result to the test determination unit 400. The test determination unit 400 compares a preset reference value with the count result from the counter 301 and thus determines whether or not the iDP reception circuit 300 passes the test.

The test data generator 201 and the test clock generator 202 are connected to the main link lane terminals of the test fixture 100 via a test cable and a test connector, and the HPD monitor 203 is connected to the HPD terminal of the test fixture 100 via the test cable and the test connector.

The test fixture 100 has the main link lane terminals and the HPD terminal. The test fixture 100 is connected to main link lane terminals and an HPD terminal of the iDP reception circuit 300 via a test cable and a test connector, and is connected to the test data generator 201, the test clock generator 202, and the HPD monitor 203 via another test cable and test connector. The test fixture 100 relays signal transmission without frequency loss through the impedance matching of the loads connected to both of the connectors.

The test data generator 201 may be implemented by the stress signal generator (SSG) which is also used for a sink device test in the DP interface. The test clock generator 202 may be implemented by the clock pattern generator which is also used for a sink device test in the DP interface. The HPD monitor 203 can be simply implemented by an oscilloscope.

Figure 8:
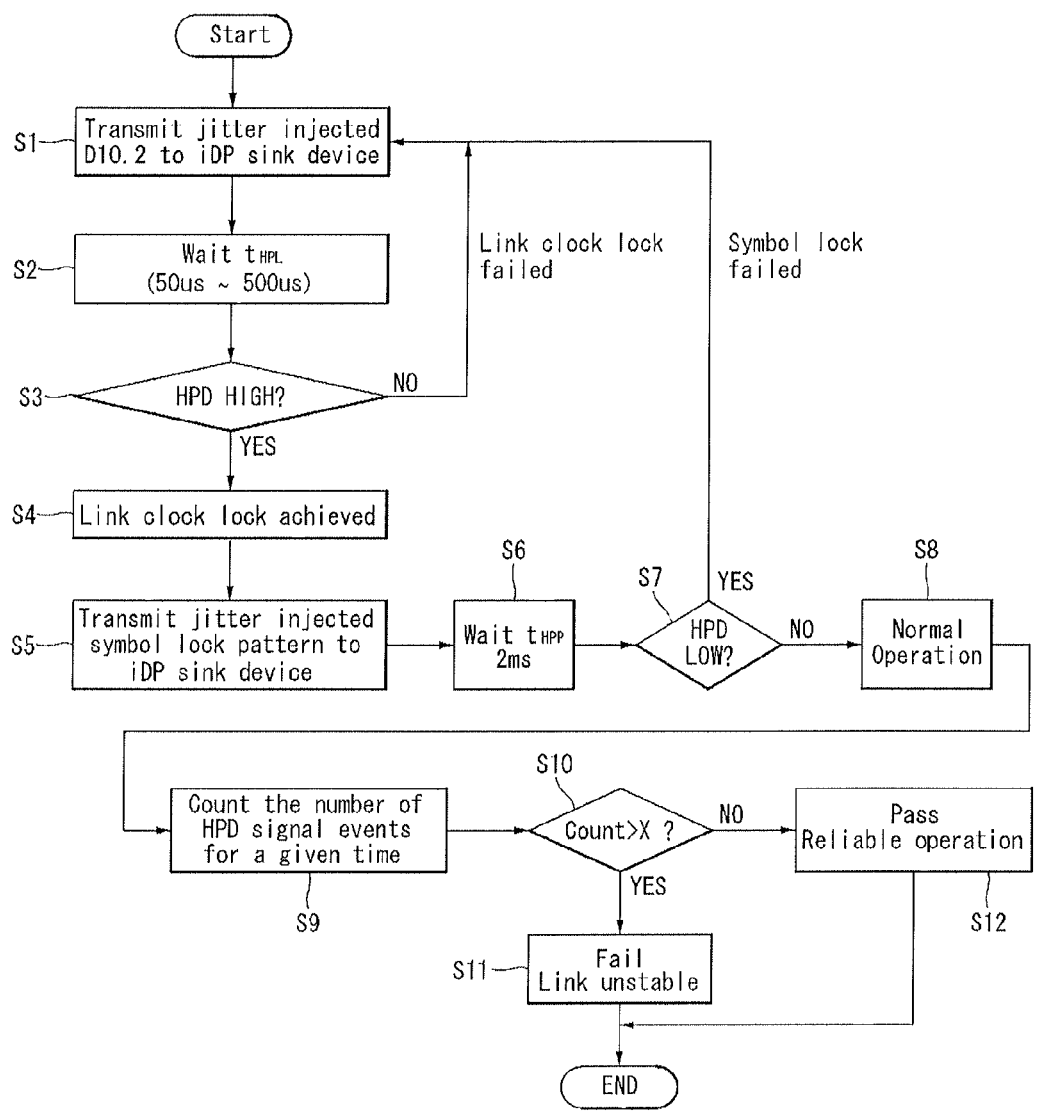
FIG. 8 is a flowchart illustrating an iDP interface test method according to an embodiment of this disclosure.

FIG. 8 is a flowchart illustrating control procedures of an iDP interface test method according to an embodiment of this document. The test method will be described along with the device configurations shown in FIGS. 6 and 7. A clock lock operation and a symbol lock operation performed in the iDP reception circuit 300, that is, the iDP sink device are substantially the same as those in the existing iDP sink device. For example, the clock and symbol lock operations in the iDP sink device may use the data and clock recovery method disclosed in "A 2.7 Gbps & 1.62 Gbps Dual-Mode Clock and Data Recovery for Display Port by Seung-won Lee, Jae-Wook Yoo, Jin-Ku Kang Dept. of Electronics Engineering INHA University, 2008 International SoC Design Conference". Therefore, detailed description of the clock lock operation and the symbol lock operation performed in the iDP sink device will be omitted.

Referring to FIGS. 6 to 8, the test data generator 201 transmits test data with the D10.2 pattern which includes jitter and satisfies an iDP TP3 EYE mask, to the iDP reception circuit 300 via the test fixture 100 and the main link lanes. In addition, the test clock generator 202 transmits the D24.3 clock signal pattern to both lines of each of the main link lanes which transmit the test data, in order to check influence on the transmission lines by crosstalk (S1). The iDP reception circuit 300 pulls the HPD signal up to the high logic level when succeeding in the link clock lock within maximum $t_{HPL}$.

In the embodiment of this document, it is determined whether or not the HPD signal is pulled up to the high logic level within maximum $t_{HPL}$, and it is determined that the link clock lock fails if the HPD signal is not reversed to the high logic level within maximum $t_{HPL}$ (the time point when 500 μsec has elapsed from the pulled-down point of the HPD signal) (S3). If the HPD signal is pulled up to the high logic level within maximum $t_{HPL}$, it is checked whether or not the symbol lock is successful. The iDP interface is designed in consideration of the closed system. For this reason, in the iDP interface, video data is promptly transmitted without separately checking lock or unlock after the symbol lock pattern data is transmitted, during the low logic section of the HPD signal. In the embodiment of this document, whether or not the symbol lock is generated in the iDP reception circuit and the link stability are indirectly determined by measuring the time $t_{HPL}$ through steps S4 to S7. In step S7, it is determined that the symbol lock fails if the HPD signal is reversed to the low logic level within the time $t_{HPL}$.

In step S5, the test determination unit 400 transmits a symbol lock pattern into which jitter is inserted to the iDP reception circuit 300 after the link clock lock is successful (S4). The test determination unit 400 checks whether or not the HPD signal is maintained to be in the high logic level for 2 msec (S6). If the HPD signal is maintained to be in the high logic level even after 2 msec has elapsed (S7), it is determined that the link clock lock and the symbol lock are successfully performed.

The counter 301 counts the trigger number of the trigger frequency of the HPD signal and outputs a count result of operation time as shown in FIGS. 4 and 5. The test determination unit 400 compares the trigger number of the HPD signal with the preset reference value X within a given time and outputs a test result. For example, if the trigger number is larger than the reference value X within the given time, the test determination unit 400 determines that the CDR operation in the iDP reception circuit 300 is unstable and thus the link stability is low, and then it outputs a fail. If the trigger number of the HPD signal is equal to or less than the reference value X within the given time, the test determination unit 400 determines that the link stability is high and outputs a pass (S9 to S12). In addition, the test determination unit 400 receives the time measuring results such as the time $t_{HPL}$ and $t_{HPP}$ for the HPD signal and an output from the counter 301, quantitatively outputs the time $t_{HPL}$ and $t_{HPP}$, and the trigger number within the given time, and outputs whether or not the link clock lock and the symbol lock are successful.

A tester can determine a test result of the iDP reception circuit 300 by personally ascertaining the HPD signal via the HPD monitor 203.

As described above, in the embodiment of this document, in the iDP interface, the link stability test for the iDP interface is possible without the auxiliary channels by the use of indirectly measuring the link status as well as the connection between the iDP transmission circuit 10 and the iDP reception circuit 20 and 300. In addition, in the embodiment of this document, it is possible to quantitatively measure the iDP interface link stability by using the HPD signal and the counter 301 which is installed inside or outside the iDP reception circuit 300, and to effectively monitor a measurement result thereof. Here, in steps S9 and S10 in FIG. 8, the given time and the reference value X may be set to be changed by a designer of the iDP interface or a seller.

Figure 9:
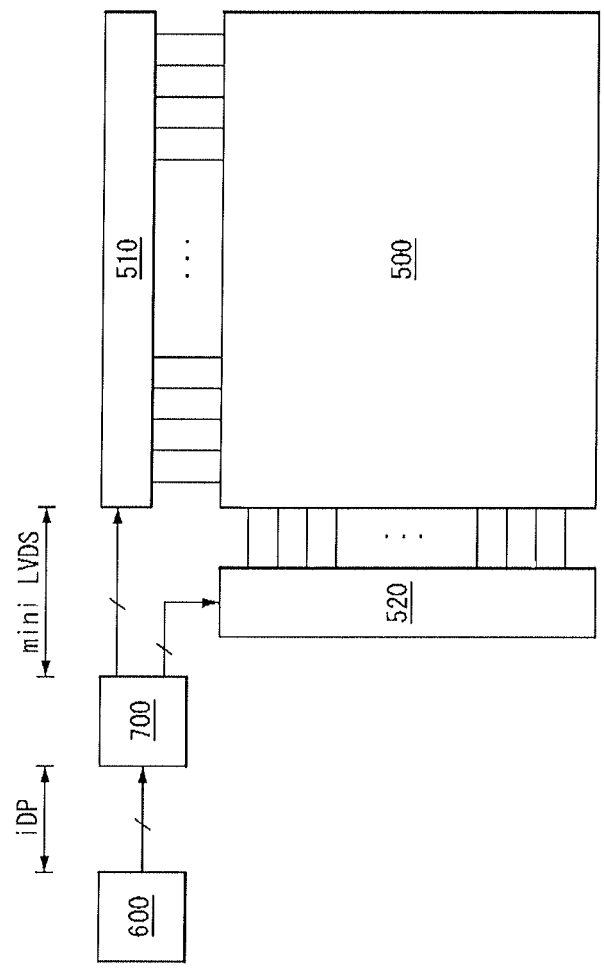
FIG. 9 is a block diagram illustrating a display device according to an embodiment of this disclosure.

An iDP interface which passes the iDP interface test according to the embodiment of this document may be applied to a display device as shown in FIG. 9.

FIG. 9 is a block diagram illustrating a display device according to an embodiment of this document.

In FIG. 9, the display device includes a display panel 500, an SoC 600, a timing controller 700, a data driving circuit 510, and a scan driving circuit 520.

The display panel 500 is provided with data lines and scan lines (or gate lines) which intersect each other. The display panel 500 includes pixels formed in a matrix, which are defined by the data lines and the scan lines. Thin film transistors (TFTs) are disposed at the intersections of the data lines and the scan lines. The display panel 500 may be implemented by a display panel of a flat panel display such as a liquid crystal display (LCD), a field emission display (FED), a plasma display panel (PDP), electroluminescence (EL) devices including inorganic or organic light emitting diodes, or an electrophoresis display (EPD). If the display panel 500 is implemented by the display panel of the LCD, a backlight unit is necessary. The backlight unit may be implemented by a direct type backlight unit or an edge type backlight unit.

The SoC 600 embeds the iDP transmission circuit 10 therein and transmits main link data including video data information to the timing controller 700 via the above-described iDP interface. The iDP reception circuit 20 and 300 embedded in the timing controller 700 recovers the pixel clocks PXLCLK by multiplying the link clocks LSCLK of the main link data by the multiplication ratio of Mvid/48, samples the digital video data with the pixel clocks PXLCLK, and transmits the sampled digital video data to the data driving circuit 510. In addition, the timing controller 700 generates timing control signals for controlling operation timings of the data driving circuit 510 and the scan driving circuit 520 based on the pixel clocks PXLCLK. An interface for data transmission between the timing controller 700 and the data driving circuit 510 may be implemented by a mini LVDS interface, but is not limited thereto. For example, the interface between the timing controller 700 and the data driving circuit 510 may employ the interface techniques proposed in U.S. patent application Ser. No. 12/543,996 (Aug. 19, 2009), U.S. patent application Ser. No. 12/461,652 (Aug. 19, 2009), and the like, which have been filed by the present applicant.

The data driving circuit 510 latches the digital video data under the control of the timing controller 700. The data driving circuit 510 converts the digital video data into data voltages which are output to the data lines. The scan driving circuit 520 sequentially supplies scan pulses synchronizing with the data voltages to the scan lines under the control of the timing controller 700.

As described above, according to this document, it is possible to check the iDP interface link stability based on the HPD signal in the iDP interface without depending on auxiliary channels. Further, it is possible to quantitatively measure the iDP interface link stability by the use of the counter which counts the trigger number of the HPD signal.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An internal Display Port (iDP) interface test method comprising:
    transmitting test clocks to an iDP sink device;
    determining whether or not a link clock lock operation in the iDP sink device is successful based on a measurement result of an (Hot Plug Detect (HPD) signal output from the iDP sink device when a clock lock operation for the test clocks is performed;
    transmitting test data and arbitrary video data to the iDP sink device if the link clock lock operation in the iDP sink device is successful;
    determining whether or not a symbol lock operation in the iDP sink device is successful based on a measurement result of the HPD signal output from the iDP sink device when the symbol lock operation for the test data and the arbitrary video data is performed; and
    counting the trigger number of the HPD signal for a given time if the symbol lock operation is successful, comparing the count result with a predetermined reference value, and determining link stability of the iDP sink device based on the result of the comparison.

2. The method claim 1, wherein determining of whether or not a link clock lock operation in the iDP sink device is successful includes:
    measuring a first time from a pulled-down point to a pulled-up point of the HPD signal; and
    determining that the link clock lock operation in the iDP sink device fails if a level of the HPD signal is not changed from a low logic level to a high logic level within the first time.

3. The method of claim 1, wherein determining of whether or not a symbol lock operation in the iDP sink device is successful includes:
    measuring a second time when the HPD signal is maintained to be in a high logic level from a pulled-up point to a subsequent pulled-down point of the HPD signal; and
    determining that the symbol lock operation in the iDP sink device fails if a level of the HPD signal is changed from the high logic level to a low logic level within the second time.

4. The method of claim 1, wherein counting of the trigger number of the HPD signal includes determining that the link stability of the iDP sink device is low if the trigger number of the HPD signal is larger than the reference value within the given time.

5. An iDP (internal Display Port) interface test device comprising:
    a test clock generator configured to generate test clocks;
    a test data generator configured to generate test data and arbitrary video data;
    an iDP sink device configured to make an HPD (Hot Plug Detect) signal have a high logic level when a clock lock operation for the test clocks is successful, maintain the HPD signal to be in the high logic level when a symbol lock operation for the test data and the arbitrary video data is successful, and make the HPD signal have a low logic level when the clock lock operation and the symbol lock fail;
    a test fixture configured to be connected between the test clock generator and the test data generator, and the iDP sink device, and transmit the test clocks, the test data, and the arbitrary video data to the iDP sink device;
    a counter configured to count the trigger number of the HPD signal if the symbol lock operation is successful; and
    a test determination unit configured to determine whether or not a link clock lock operation in the iDP sink device is successful based on a measurement result of the HPD signal generated when a clock lock operation for the test clocks is performed; determine whether or not a symbol lock operation in the iDP sink device is successful based on a measurement result of the HPD signal when the symbol lock operation for the test data and the arbitrary video data is performed; and compare an output from the counter with a predetermined reference value, and determine link stability of the iDP sink device based on the comparison result.

6. The device claim 5, wherein the test determination unit measures a first time from a pulled-down point to a pulled-up point of the HPD signal, and determines that the link clock lock operation in the iDP sink device fails if a level of the HPD signal is not changed from a low logic level to a high logic level within the first time.

7. The device of claim 5, wherein the test determination unit measures a second time when the HPD signal is maintained to be in a high logic level from a pulled-up point to a subsequent pulled-down point of the HPD signal, and determines that the symbol lock operation in the iDP sink device fails if a level of the HPD signal is changed from the high logic level to a low logic level within the second time.

8. The device of claim 5, wherein the test determination unit determines that the link stability of the iDP sink device is low if the trigger number of the HPD signal is larger than the reference value within the given time.

9. The device of claim 5, wherein the counter is embedded in the iDP sink device or is installed outside the iDP sink device.

* * * * *